(12) United States Patent
Oono et al.

(10) Patent No.: US 10,363,637 B2
(45) Date of Patent: Jul. 30, 2019

(54) MOLDING SYSTEM

(71) Applicant: FANUC CORPORATION, Yamanashi (JP)

(72) Inventors: Hajime Oono, Yamanashi-ken (JP); Naoaki Seki, Yamanashi-ken (JP); Ryousuke Mori, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/946,056

(22) Filed: Apr. 5, 2018

(65) Prior Publication Data

US 2018/0290248 A1     Oct. 11, 2018

(30) Foreign Application Priority Data

Apr. 7, 2017  (JP) ................. 2017-076425

(51) Int. Cl.
*B23P 19/06* (2006.01)
*B25J 11/00* (2006.01)
(Continued)

(52) U.S. Cl.
CPC ............. *B23P 19/06* (2013.01); *B25J 11/005* (2013.01); *B25J 13/00* (2013.01); *B25J 13/08* (2013.01); *B25J 13/081* (2013.01); *B25J 13/086* (2013.01); *B25J 13/087* (2013.01); *B25J 13/088* (2013.01); *B25J 19/023* (2013.01); *B29C 45/262* (2013.01);
(Continued)

(58) Field of Classification Search
CPC .......... B23P 19/06; B25J 11/005; B25J 13/00; B25J 13/08; B25J 13/086; B25J 13/087; B25J 13/088; B25J 19/023; B29C 45/262; Y10S 901/47; Y10T 29/49767;
(Continued)

(56) References Cited

U.S. PATENT DOCUMENTS 4,744,719 A * 5/1988 Asano ................. B25J 5/02
                                                    318/568.24
5,540,543 A * 7/1996 Lust ................... B29C 31/006
                                                    414/225.01

FOREIGN PATENT DOCUMENTS

JP     63-216718 A    9/1988
JP     08-011173 A    1/1996
(Continued)

OTHER PUBLICATIONS

English Abstract and Machine Translation for Japanese Publication No. 2013-082083 A, published May 9, 2013, 10 pgs.
(Continued)

*Primary Examiner* — Jermie E Cozart
(74) *Attorney, Agent, or Firm* — Fredrikson & Byron, P.A.

(57) ABSTRACT

A molding system for assembling a part by moving a workpiece gripped by a hand of a robot toward a mold of an injection molding machine, while rotating a molded article supported on the mold and the workpiece relative to each other, whereby the molded article and the workpiece are screw-engaged. The molding system includes a rotation detector for detecting a rotational amount between the molded article and the workpiece, an assembled state judging unit for judging if the assembled part is in a predetermined state, and a control unit for relatively rotating and displacing the molded article and the workpiece until the rotational amount exceeds a predetermined rotational amount and the assembled state becomes the predetermined state.

5 Claims, 9 Drawing Sheets

(51) Int. Cl.
  *B25J 13/00* (2006.01)
  *B25J 13/08* (2006.01)
  *B25J 19/02* (2006.01)
  *B29C 45/26* (2006.01)
  *B29C 45/42* (2006.01)
  *B29C 45/76* (2006.01)

(52) U.S. Cl.
  CPC ...... *B29C 45/4225* (2013.01); *B29C 45/7626* (2013.01); *B29C 2945/76033* (2013.01); *B29C 2945/76729* (2013.01); *B29C 2945/76899* (2013.01); *Y10S 901/41* (2013.01); *Y10S 901/47* (2013.01); *Y10T 29/49767* (2015.01); *Y10T 29/49769* (2015.01); *Y10T 29/53061* (2015.01); *Y10T 29/53087* (2015.01)

(58) Field of Classification Search
  CPC ......... Y10T 29/49769; Y10T 29/53061; Y10T 29/53087
  See application file for complete search history.

(56) References Cited

FOREIGN PATENT DOCUMENTS

| | | |
|---|---|---|
| JP | 2000-238090 A | 9/2000 |
| JP | 201382083 A | 5/2013 |

OTHER PUBLICATIONS

English Abstract and Machine Translation for Japanese Publication No. 2000-238090 A, published Sep. 5, 2000, 15 pages.
English Abstract and Machine Translation for Japanese Publication No. 63-216718 A, published Sep. 9, 1988, 6 pages.
English Abstract and Machine Translation for Japanese Publication No. 08-011173 A, published Jan. 16, 1996, 14 pages.
English Machine Translation of Decision to Grant issued by Japan Patent Office (JPO) in Japanese Application No. 2017-076425, dated Nov. 20, 2018, 3 pages.
Untranslated Decision to Grant issued by Japan Patent Office (JPO) in Japanese Application No. 2017-076425, dated Nov. 20, 2018, 3 pages.

* cited by examiner

MOLDING SYSTEM

CROSS-REFERENCE TO RELATED APPLICATION

This application is based upon and claims the benefit of priority from Japanese Patent Application No. 2017-076425 filed on Apr. 7, 2017, the contents of which are incorporated herein by reference.

BACKGROUND OF THE INVENTION

Field of the Invention

The present invention relates to a molding system for assembling parts by displacing a workpiece while rotating a molded article, having been injection-molded, and the workpiece relative to each other, so that the molded article and the workpiece are screw-engaged with each other.

Description of the Related Art

Japanese Laid-Open Patent Publication No. 2013-082083 discloses a rotation core control device for an unscrewing mold in which a screw-type core attached to a mold (movable mold) on a movable side of an injection molding machine is rotated by a servomotor to take out from the mold a molded article having been injection-molded.

Further, there is a technology wherein as is the case with the rotation core controller disclosed in the Japanese Laid-Open Patent Publication No. 2013-082083, a screw-shaped molded article is injection-molded by the use of a mold equipped with a servomotor and thereafter, the molded article in the state of being supported on the mold is screw-engaged with a workpiece to assemble a product. In this assembling technology, the servomotor screw-engages the molded article with the workpiece only by rotating through a predetermined rotational amount.

SUMMARY OF THE INVENTION

As is the case with the aforementioned assembling technology, the fastening between the molded article and the workpiece often becomes insufficient even when the servomotor is rotated through the predetermined rotational amount only. For example, if the molded article or the workpiece is rotated but not engaged, the fastening between the molded article and the workpiece is still insufficient after the servomotor has been rotated only through the predetermined rotational amount.

The present invention has been made in order to solve the aforementioned problem. It is an object of the present invention to provide a molding system capable of sufficiently fastening a molded article with a workpiece.

In one aspect of the present invention, there is provided a molding system configured to assemble parts through screw-engagement between the molded article and the workpiece by rotating a molded article supported on a mold of an injection molding machine and a workpiece griped by a hand of a robot relative to each other and displacing the workpiece toward the mold. The molding system includes a rotation detector configured to detect a relative rotational amount between the molded article and the workpiece, an assembled state judging unit configured to judge if the assembled state of the parts is a predetermined state, and a control unit configured to relatively rotate and displace the molded article and the workpiece until the rotational amount detected by the rotation detector exceeds a predetermined rotational amount and until the assembled state judged by the assembled state judging unit becomes the predetermined state.

According to the present invention, it is possible to sufficiently fasten the molded article with the workpiece.

The above and other objects, features and advantages of the present invention will become more apparent from the following description when taken in conjunction with the accompanying drawings, in which preferred embodiments of the present invention are shown by way of illustrative examples.

DESCRIPTION OF THE PREFERRED EMBODIMENTS

Hereafter, a molding system according to the present invention will be described in detail based on preferred embodiments with reference to the accompanying drawings.

[Configuration of Molding System 10]

Figure 1:
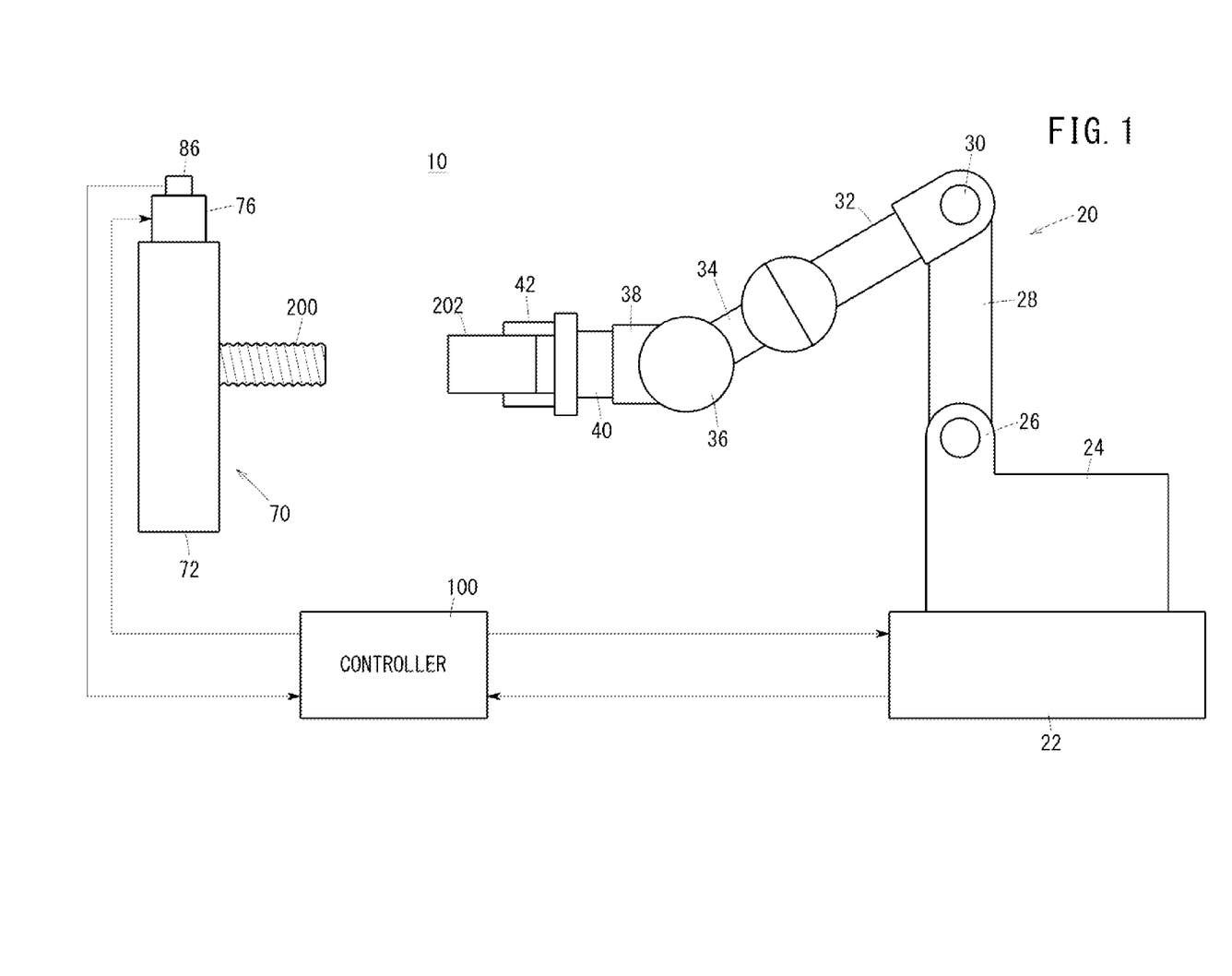
FIG. 1 is a view showing the overall configuration of a molding system in respective embodiments according to the present invention.
Figure 2:
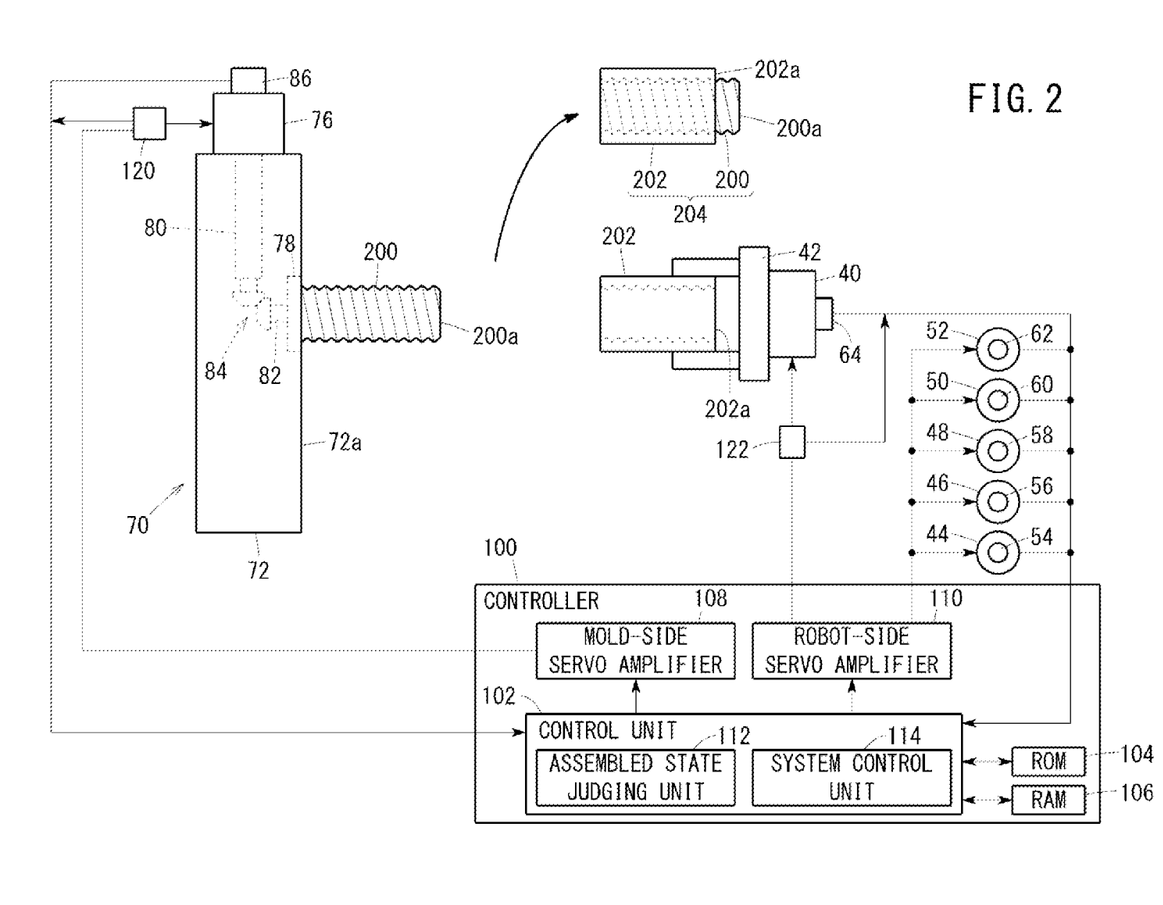
FIG. 2 is an electrical block diagram in a first embodiment according to the present invention.

FIG. 1 is a view showing the overall configuration of a molding system 10 in respective embodiments according to the present invention. FIG. 2 is an electrical block diagram in a first embodiment according to the present invention. With reference to FIGS. 1 and 2, the configuration of the molding system 10 common to respective embodiments will be explained below. The molding system 10 is formed of a robot 20, a mold 70 and a controller 100.

As shown in FIG. 1, the robot 20 is an articulated robot for industrial use and is equipped with a base portion 22, a swivel portion 24, a first joint 26, a first arm 28, a second joint 30, a second arm 32, a third arm 34, a third joint 36, a fourth arm 38, a sixth servomotor 40, and a hand 42. The base portion 22 is installed on an installation surface. The swivel portion 24 is supported on the base portion 22 and swivels by the driving force of a first servomotor 44 (FIG. 2). The first arm 28 is supported on the swivel portion 24 and turns about the first joint 26 by the driving force of a second servomotor 46 (FIG. 2). The second arm 32 is supported by the first arm 28 and turns about the second joint 30 by the driving force of a third servomotor 48 (FIG. 2). The third arm 34 is attached to a tip end of the second arm 32 and rotates about an axis of the second arm 32 by the driving force of a fourth servomotor 50 (FIG. 2). The fourth arm 38 is supported by the third arm 34 and rotates about the third joint 36 by the driving force of a fifth servomotor 52 (FIG. 2). The sixth servomotor 40 is attached to an end of the fourth arm 38. The hand 42 is attached to an output shaft of the sixth servomotor 40 and rotates about the output shaft by the driving force of the sixth servomotor 40. The hand 42 grips a cylindrical workpiece 202 that is formed with its inner peripheral surface screw-threaded and screw-grooved.

As shown in FIG. 2, the first to sixth servomotors 44, 46, 48, 50, 52, 40 are electrically connected to a robot-side servo amplifier 110 of the controller 100 and are each driven by a drive current supplied from the robot-side servo amplifier 110. The first through sixth servomotors 44, 46, 48, 50, 52, 40 are respectively provided with rotation detectors 54, 56, 58, 60, 62, 64 for detecting the rotational amounts of respective output shafts. Used as the rotation detectors 54, 56, 58, 60, 62, 64 are, for example, rotary encoders or resolvers for detecting rotational displacements of the output shafts. The rotation detectors 54, 56, 58, 60, 62, 64 are electrically connected to a control unit 102 of the controller 100 and output detection signals to the control unit 102. The first to sixth servomotors 44, 46, 48, 50, 52, 40 are feedback-controlled based on the detection signals from the rotation detectors 54, 56, 58, 60, 62, 64.

As shown in FIG. 2, the mold 70 is a movable mold provided as paired with a fixed mold (not shown) at a mold clamping portion of an injection molding machine (not shown) and is equipped with a mold main body 72 and a mold-side servomotor 76.

The mold main body 72 has a turn table 78 on the side of a split face 72a and has a driving force transmission 84 inside. The turn table 78 is mounted rotatably relative to the mold main body 72. The driving force transmission 84 connects an output shaft 80 of the mold-side servomotor 76 to a rotational shaft 82 of the turn table 78 and transmits the driving force generated by the mold-side servomotor 76 to the turn table 78. The driving force transmission 84 is shown as two bevel gears in FIG. 2, but is not limited thereto. For example, as the driving force transmission 84, a plurality of gears, or pulleys and a belt may be provided.

A part (including a center portion) of the turn table 78 is placed in a recess in the fixed mold in the state that the mold main body 72 and the fixed mold are closed. When an injection molding is performed with the mold main body 72 and the fixed mold closed, a molded article 200 is formed between the turn table 78 and the recess in the fixed mold. When the mold main body 72 is opened relative to the fixed mold, the molded article 200 is supported by the turn table 78. Since the recess in the fixed mold is threaded, a screw thread and a screw groove are formed on an outer peripheral surface of the molded article 200. Thus, when the molded article 200 is withdrawn from the recess in the fixed mold, the mold-side servomotor 76 rotates the turn table 78 and the molded article 200.

The mold-side servomotor 76 is attached to an external surface of the mold main body 72. The mold-side servomotor 76 is electrically connected to a mold-side servo amplifier 108 of the controller 100 and is driven by a drive current supplied from the mold-side servo amplifier 108. The mold-side servomotor 76 is provided with a rotation detector 86 for detecting the rotational amount of the output shaft 80. Examples of the rotation detector 86 include a rotary encoder and a resolver for detecting the rotational displacement of the output shaft 80. The rotation detector 86 is electrically connected to the control unit 102 of the controller 100 and outputs a detection signal to the control unit 102.

The controller 100 is equipped with the control unit 102, a ROM 104, a RAM 106, the mold-side servo amplifier 108, and the robot-side servo amplifier 110.

The control unit 102 is equipped with a processor such as a CPU or the like and performs respective functions including an assembled state judging unit 112 and a system control unit 114 by reading out and executing programs stored in the ROM 104 or data stored in the RAM 106. The assembled state judging unit 112 monitors the assembled state between the molded article 200 and the workpiece 202 and judges whether a predetermined assembled state stored in the ROM 104 has been attained or not. As described later, a determination criterion for the assembled state differs depending on embodiments. The system control unit 114 outputs command signals to the mold-side servo amplifier 108 and the robot-side servo amplifier 110 and controls the overall operation of the molding system 10.

The mold-side servo amplifier 108 is a driver for rotationally driving the mold-side servomotor 76 and outputs a drive current to the mold-side servomotor 76 responsive to a command signal outputted from the control unit 102.

The robot-side servo amplifier 110 is a driver for rotationally driving the first through sixth servomotors 44, 46, 48, 50, 52, 40 of the robot 20. The robot-side servo amplifier 110 outputs drive currents to the first through sixth servomotors 44, 46, 48, 50, 52, 40 responsive to command signals outputted from the control unit 102.

Respective Embodiments

The molding system 10 according to the present invention is a system that screw-engages the molded article 200 with the workpiece 202 to obtain an assembled part 204 by displacing the workpiece 202 toward the mold 70 while relatively rotating the molded article 200 supported on the mold 70 and the workpiece 202 gripped by the hand 42 of the robot 20. When the molded article 200 and the workpiece 202 are relatively rotated, the molded article 200 may be rotated or the workpiece 202 may be rotated. In the respective embodiments described hereafter, description will mainly be made regarding a control wherein the molded article 200 is rotated, and as a modification, description will be made regarding a control wherein the workpiece 202 is rotated.

First Embodiment

The first embodiment will be described with reference to FIG. 2. As the screw engagement between the molded article 200 and the workpiece 202 proceeds, a tip end portion 200a of the molded article 200 penetrates through the workpiece 202 to abut on the hand 42. In this state, the molded article 200 is sufficient fastened with the workpiece 202, and thus, the assembly is completed as the assembled part 204. When the tip end portion 200a of the molded article 200 abuts on the hand 42, the load current value of the mold-side servomotor 76 increases. In the first embodiment, the assembled state judging unit 112 judges that the assembled state has become a predetermined state when the load current value of the mold-side servomotor 76 becomes equal to or higher than a predetermined current value stored in the ROM 104.

The load current value of the mold-side servomotor 76 is measured by a current measuring device 120. As the current measuring device 120, there can be used a current sensor for measuring the current value supplied from the mold-side servo amplifier 108 to the mold-side servomotor 76. The current measuring device 120 is electrically connected to the control unit 102 of the controller 100 and outputs a measurement signal to the controller 100.

[Operation of Molding System 10 of First Embodiment]

Figure 3:
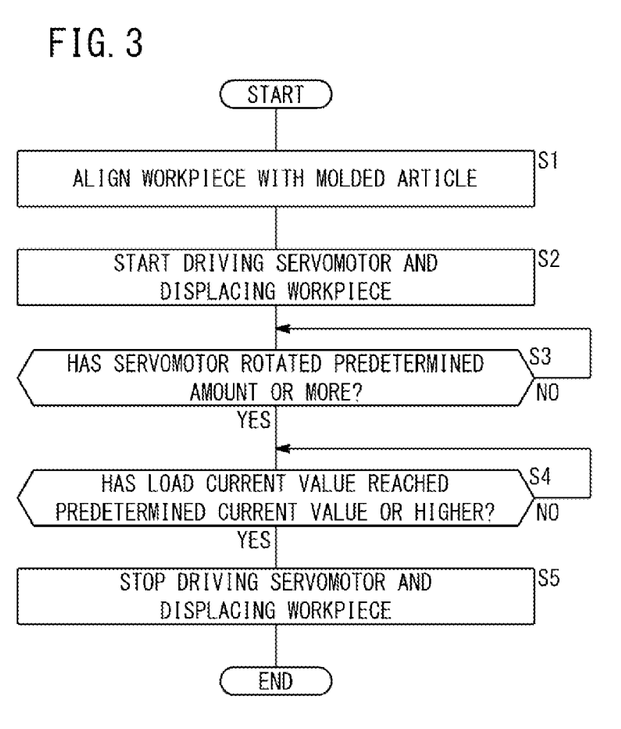
FIG. 3 is a flowchart describing the operation in the first embodiment.

FIG. 3 is a flowchart describing the operation in the first embodiment. The operation will be explained based on the assumption that prior to operation shown in FIG. 3, the molded article 200 has already been molded on the turn table 78 of the mold 70 and the workpiece 202 has been gripped by the hand 42 of the robot 20.

At step S1, the system control unit 114 of the controller 100 controls the first through sixth servomotors 44, 46, 48, 50, 52, 40 of the robot 20 to align the workpiece 202 with the molded article 200. The robot 20 conveys the workpiece 202 to a predetermined initial position. In a case where the workpiece 202 is disposed at the initial position, the axis of the workpiece 202 agrees with the axis of the molded article 200.

At step S2, the system control unit 114 outputs a command signal to the mold-side servo amplifier 108 in order to rotate the molded article 200. The mold-side servo amplifier 108 supplies the mold-side servomotor 76 with a drive current to start driving the mold-side servomotor 76. At this time, the system control unit 114 monitors the rotational amount of the mold-side servomotor 76 based on a detection signal outputted from the rotation detector 86. Further, the assembled state judging unit 112 monitors the load current value of the mold-side servomotor 76 based on a detection signal outputted from the current measuring device 120.

Further, in order to displace the workpiece 202 toward the mold 70, the system control unit 114 outputs a command signal to the robot-side servo amplifier 110. The robot-side servo amplifier 110 supplies drive currents to some or all of the first through sixth servomotors 44, 46, 48, 50, 52, 40 to start displacing the workpiece 202. Then, the workpiece 202 is displaced to come close to the molded article 200 while the molded article 200 and the workpiece 202 are relatively rotated, whereby the molded article 200 and the workpiece 202 are brought into screw engagement.

In the ROM 104, the rotational speed of the mold-side servomotor 76 and the displacement speed of the workpiece 202 are associated with each other and stored. The system control unit 114 reads out the rotational speed of the mold-side servomotor 76 and the displacement speed of the workpiece 202 from the ROM 104 and controls accordingly.

At step S3, the system control unit 114 determines whether or not the rotational amount of the mold-side servomotor 76 has reached the predetermined rotational amount stored in the ROM 104. When the rotational amount is equal to or larger than the predetermined rotational amount (step S3: YES), the processing proceeds to step S4. On the other hand, when the rotational amount is less than the predetermined rotational amount or larger (step S3: NO), the processing at step S3 is repeated.

When the processing proceeds from step S3 to step S4, the assembled state judging unit 112 judges whether or not the load current value of the mold-side servomotor 76 has reached the predetermined current value stored in the ROM 104. When the current value is equal to or greater than the predetermined current value, that is, when the tip end portion 200a of the molded article 200 abuts on the hand 42 (step S4: YES), the processing proceeds to step S5. On the other hand, when the current value is less than the predetermined current value, that is, when the tip end portion 200a of the molded article 200 does not abut on the hand 42 (step S4: NO), the processing at step S4 is repeated.

When the processing proceeds from step S4 to step S5, the system control unit 114 outputs a command signal to the mold-side servo amplifier 108 in order to stop the rotation of the molded article 200. The mold-side servo amplifier 108 discontinues the supply of the drive current to the mold-side servomotor 76 to stop driving the mold-side servomotor 76.

Further, the system control unit 114 outputs a command signal to the robot-side servo amplifier 110 in order to stop the displacement of the workpiece 202. The robot-side servo amplifier 110 discontinues the supplies of the drive current to the first through sixth servomotors 44, 46, 48, 50, 52, 40 to stop the displacement of the workpiece 202.

At the stage where the processing at step S5 is ended, the assembled part 204 is supported on the turn table 78. When a removal mechanism (not shown) is operated with the robot 20 gripping the assembled part 204, the assembled part 204 is removed from the turn table 78.

Modification of First Embodiment

Although in the aforementioned embodiment, the molded article 200 is rotated to be screw-engaged with the workpiece 202, the workpiece 202 may be rotated in place of rotating the molded article 200 in a modification of the first embodiment. In this case, the sixth servomotor 40 of the robot 20 is driven in place of driving the mold-side servomotor 76.

In the modification of the first embodiment, the assembled state judging unit 112 judges that the assembled state has become the predetermined state when the load current value of the sixth servomotor 40 becomes equal to or higher than the predetermined current value stored in the ROM 104.

The load current value of the sixth servomotor 40 is measured by a current measuring device 122. As the current measuring device 122, there may be used a current sensor for measuring an electric current value supplied from the robot-side servo amplifier 110 to the sixth servomotor 40. The current measuring device 122 is electrically connected to the control unit 102 of the controller 100 and outputs a measurement signal to the controller 100.

The operation of the modification in the first embodiment is basically the same as the operation shown in FIG. 3. However, of the operation shown in FIG. 3, the operation having been performed by the mold-side servo amplifier 108 is performed by the robot-side servo amplifier 110, the operation having been performed by the mold-side servomotor 76 is performed by the sixth servomotor 40, and the operation having been performed by the current measuring device 120 is performed by the current measuring device 122.

Second Embodiment

Figure 4:
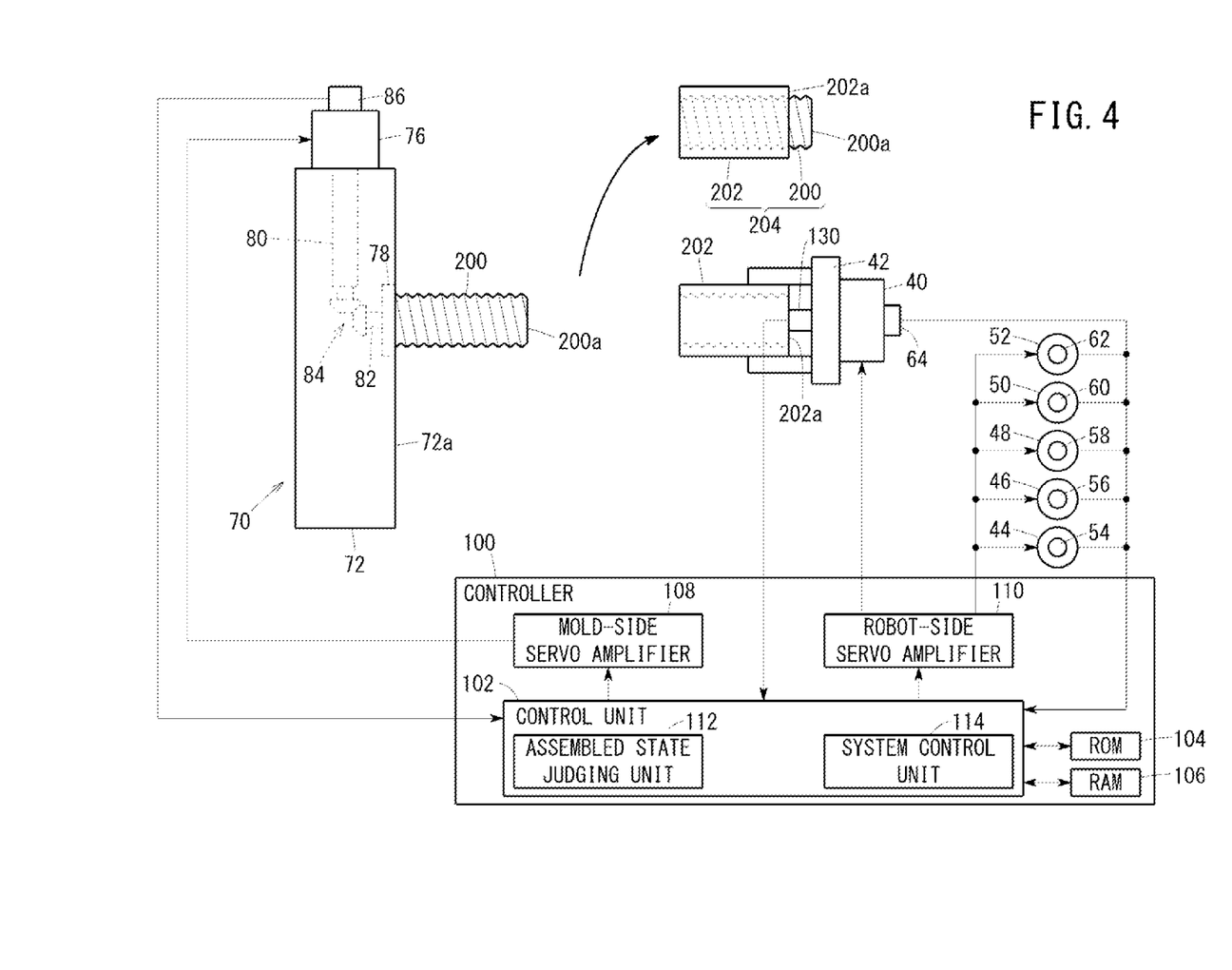
FIG. 4 is an electrical block diagram in a second embodiment according to the present invention.

FIG. 4 is an electrical block diagram in a second embodiment according to the present invention. The second embodiment will be described with reference to FIG. 4. As the screw engagement between the molded article 200 and the workpiece 202 proceeds, the tip end portion 200a of the molded article 200 penetrates through the workpiece 202. In this state, the molded article 200 is sufficiently fastened with the workpiece 202 and thus, the assembly is completed as the assembled part 204. In the second embodiment, the assembled state judging unit 112 judges that the assembled state has become the predetermined state when the tip end portion 200a of the molded article 200 penetrates through the workpiece 202.

A camera 130 captures an image of the end portion 202a of the workpiece 202. The camera 130 is attached to the hand 42 with its shooting direction directed toward the end portion 202a of the workpiece 202. The camera 130 outputs captured image information to the control unit 102.

[Operation of Molding System 10 of Second Embodiment]

Figure 5:
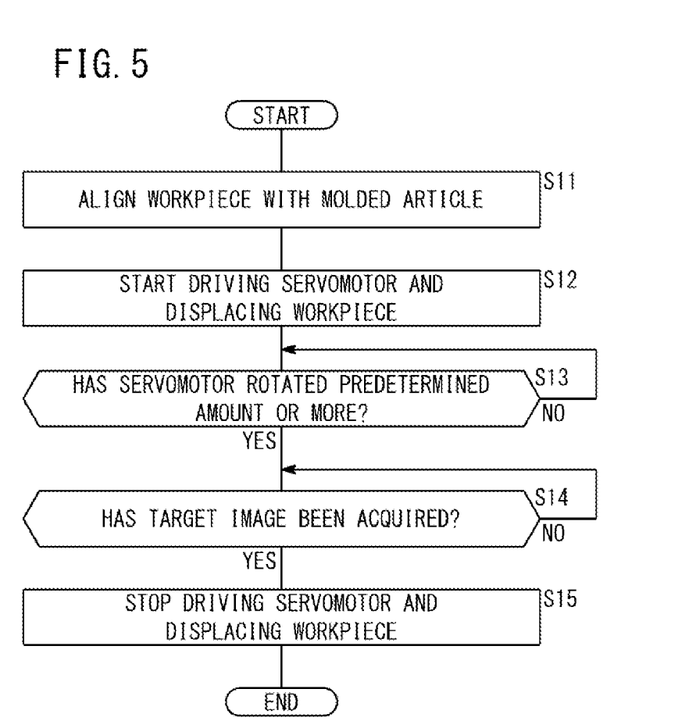
FIG. 5 is a flowchart describing the operation in the second embodiment.

FIG. 5 is a flowchart describing the operation of the second embodiment. The processing at step S11 to step S13 and step S15 shown in FIG. 5 are the same as the processing at step S1 to step S3 and step S5 shown in FIG. 3. Hereinafter, the processing at step S14 differing from the processing at step S4 in FIG. 3 will be described.

At step S14, the assembled state judging unit 112 judges whether or not the image captured by the camera 130 corresponds to a target image. The assembled state judging unit 112 performs an image recognition based on the image information outputted from the camera 130 and recognizes the end portion 202a of the workpiece 202. The ROM 104 stores image information concerning the tip end portion 200a of the molded article 200 protrudes a predetermined amount from the end portion 202a of the workpiece 202. Using a template matching technique or the like, the assembled state judging unit 112 judges whether or not the recognized image agrees with the image stored in the ROM 104. When the target image has been acquired, that is, when the tip end portion 200a of the molded article 200 protrudes the predetermined amount from the end portion 202a of the workpiece 202 (step S14: YES), the processing proceeds to step S15. On the other hand, when the target image has not been acquired, that is, when the tip end portion 200a of the molded article 200 does not protrude the predetermined amount from the end portion 202a of the workpiece 202 (step S14: NO), the processing at step S14 is repeated.

Modification of Second Embodiment

Although in the aforementioned embodiment, the molded article 200 is screw-engaged with the workpiece 202 while being rotated, the workpiece 202 may be rotated in place of rotating the molded article 200 in a modification of the second embodiment. In this case, not the mold-side servomotor 76 but the sixth servomotor 40 of the robot 20 is driven.

The operation of the modification in the second embodiment is basically the same as the operation shown in FIG. 5. However, of the operation shown in FIG. 5, the operation having been performed by the mold-side servo amplifier 108 is performed by the robot-side servo amplifier 110, and the operation having been performed by the mold-side servomotor 76 is performed by the sixth servomotor 40.

Third Embodiment

Figure 6:
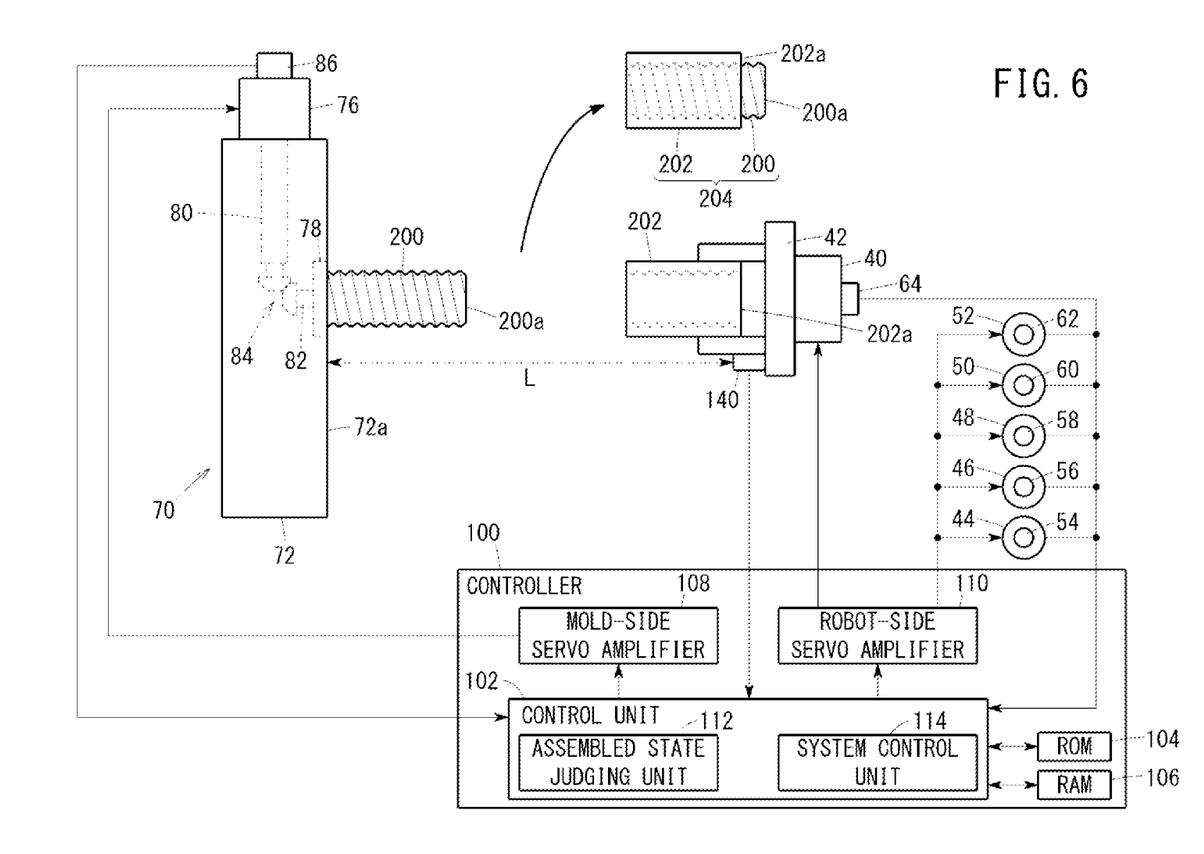
FIG. 6 is an electrical block diagram in a third embodiment according to the present invention.

FIG. 6 is an electrical block diagram in a third embodiment according to the present invention. The third embodiment will be described with reference to FIG. 6. When the screw engagement between the molded article 200 and the workpiece 202 proceeds, the displacement amount of the workpiece 202 toward the mold 70 becomes equal to or large than a predetermined displacement amount. In this state, the molded article 200 is sufficiently fastened with the workpiece 202, and thus, the assembly is completed as the assembled part 204. In the third embodiment, the assembled state judging unit 112 judges that the assembled state has become the predetermined state when the displacement amount of the workpiece 202 becomes equal to or larger than the predetermined displacement amount.

The displacement of the workpiece 202 is measured by a displacement sensor 140. As the displacement sensor 140, a passive type or an active type of sensor can be used. The displacement sensor 140 is attached to the hand 42, for example, and measures a distance L to the split face 72a of the mold main body 72 to measure the displacement amount of the workpiece 202. The displacement sensor 140 is electrically connected to the control unit 102 of the controller 100 and outputs a measurement signal to the control unit 102.

[Operation of Molding System 10 of Third Embodiment]

Figure 7:
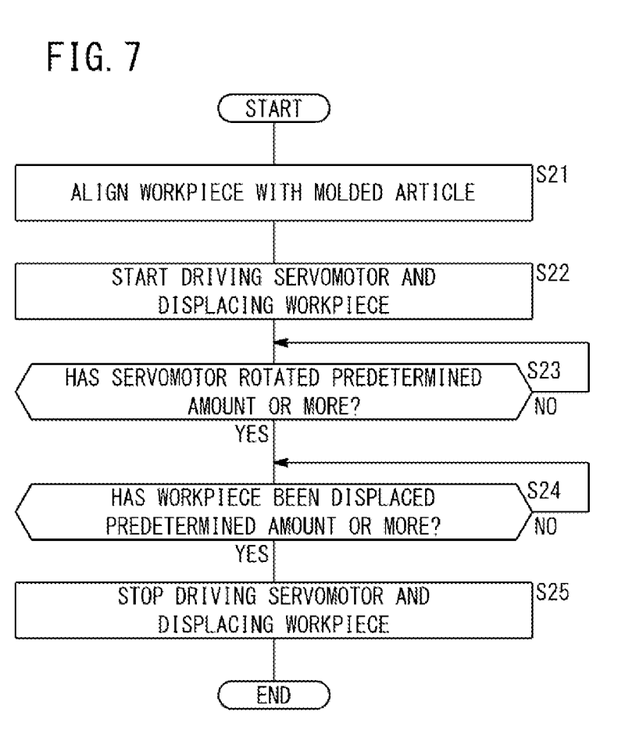
FIG. 7 is a flowchart describing the operation in the third embodiment.

FIG. 7 is a flowchart describing the operation of the third embodiment. The processing at step S21 to step S23 and step S25 shown in FIG. 7 are the same as the processing at step S1 to step S3 and step S5 shown in FIG. 3. Hereinafter, description will be made regarding the processing at step S24 differing from the processing at step S4 in FIG. 3.

At step S24, the assembled state judging unit 112 judges s whether or not the displacement amount of the workpiece 202 has become equal to or larger than the predetermined displacement amount stored in the ROM 104. The processing proceeds to step S25 when the workpiece 202 is displaced the predetermined displacement amount or larger (step S24: YES). On the other hand, the processing at step S24 is repeated until the workpiece 202 is displaced the predetermined displacement amount (step S24: NO).

Modification of Third Embodiment

Although in the aforementioned embodiment, the molded article 200 is screw-engaged with the workpiece 202 while being rotated, the workpiece 202 may be rotated in place of rotating the molded article 200 in a modified third embodiment. In this case, not the mold-side servomotor 76 but the sixth servomotor 40 of the robot 20 is driven.

The operation of the modified in the third embodiment is basically same as the operation shown in FIG. 7. However, of the operation shown in FIG. 7, the operation having been performed by the mold-side servo amplifier 108 is performed by the robot-side servo amplifier 110, and the operation having been performed by the mold-side servomotor 76 is performed by the sixth servomotor 40.

Fourth Embodiment

Figure 8:
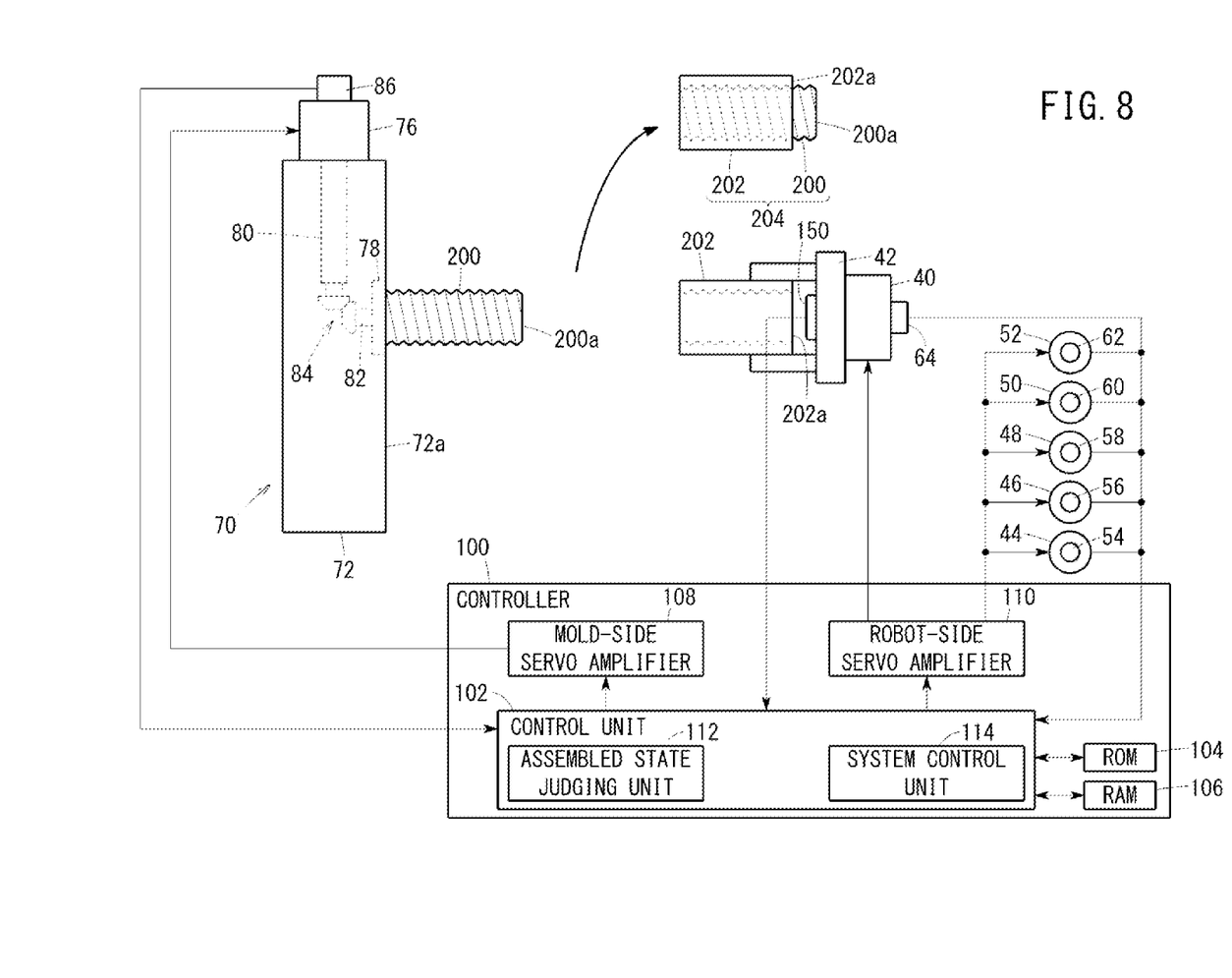
FIG. 8 is an electrical block diagram in a fourth embodiment according to the present invention.

FIG. 8 is an electrical block diagram in a fourth embodiment according to the present invention. The fourth embodiment will be described with reference to FIG. 8. In the first embodiment, the current measuring device 120, 122 detects the abutment between the tip end portion 200a of the molded article 200 and the hand 42. On the other hand, in the fourth embodiment, a touch switch 150 detects the abutment between the tip end portion 200a of the molded article 200 and the hand 42. The touch switch 150 is attached to the hand 42 at a portion facing the molded article 200 through the workpiece 202 when the assembled part 204 is assembled. The touch switch 150 is electrically connected to the control unit 102 of the controller 100 and outputs a detection signal to the control unit 102.

[Operation of Molding System 10 of Fourth Embodiment]

Figure 9:
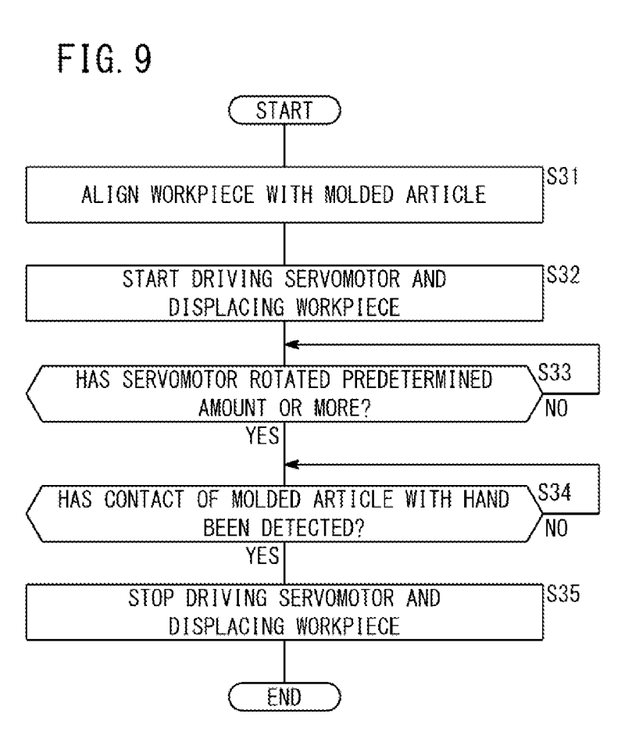
FIG. 9 is a flow chart describing the operation in the fourth embodiment.

FIG. 9 is a flowchart describing the operation of the fourth embodiment. The processing at step S31 to step S33 and step S35 shown in FIG. 9 are the same as the processing at step S1 to step S3 and step S5 shown in FIG. 3. Hereinafter, description will be made regarding the processing at step S34 differing from the processing at step S4 in FIG. 3.

At step S34, the assembled state judging unit 112 judges whether or not the contact of the molded article 200 with the hand 42 has been detected, from the detection result of the touch switch 150. When a touch detection signal is outputted from the touch switch 150, that is, when the tip end portion 200a of the molded article 200 abuts on the hand 42 (step S34: YES), the processing is moved to step S35. On the other hand, when the touch detection signal has not outputted from the touch switch 150, that is, when the tip end portion 200a of the molded article 200 is not in contact with the hand 42 (step S34: NO), the processing at step S34 is repeated.

Modification of Fourth Embodiment

Although in the aforementioned embodiment, the molded article 200 is screw-engaged with the workpiece 202 while being rotated, the workpiece 202 may be rotated in place of rotating the molded article 200 in a modified fourth embodiment. In this case, not the mold-side servomotor 76 but the sixth servomotor 40 of the robot 20 is driven.

The operation of the modification in the fourth embodiment is basically the same as the operation shown in FIG. 9. However, of the operation shown in FIG. 9, the operation having been performed by the mold-side servo amplifier 108 is performed by the robot-side servo amplifier 110, and the operation having been performed by the mold-side servomotor 76 is performed by the sixth servomotor 40.

[Technical Concept or Idea Grasped from Embodiments]

Description will be made regarding the technical concept or idea grasped from the aforementioned first to fourth embodiments and the respective modifications.

According to the present invention, a molding system (10) is provided for assembling a part (204) by displacing a workpiece (202), which is gripped by a hand (42) of a robot (20), toward a mold (70) of an injection molding machine, while rotating the workpiece (202) and a molded article (200), which is supported on the mold (70), relative to each other, whereby the molded article (200) and the workpiece (202) are screw-engaged with each other, the molding system (10) comprises a rotation detector (64, 86) configured to detect a relative rotational amount between the molded article (200) and the workpiece (202), an assembled state judging unit (112) configured to judge whether an assembled state of the assembled part (204) corresponds to a predetermined state or not, and a control unit (114) configured to relatively rotate and displace the molded article (200) and the workpiece (202) until the rotational amount detected by the rotation detector (64, 86) exceeds a predetermined rotational amount and until the assembled state determined by the assembled state judging unit (112) becomes the predetermined state. With this arrangement, it is possible to relatively rotate the molded article (200) and the workpiece (202) until the assembled state of the part (204) becomes the predetermined state, so that the molded article (200) can be sufficiently fastened with the workpiece (202).

The molding system (10) may further comprise a current measuring device (120, 122) configured to measure a load current value of a motor (40, 76) which relatively rotates the molded article (200) and the workpiece (202). The assembled state judging unit (112) may be configured to judge that the assembled state has become the predetermined state when the load current value measured by the current measuring device (120, 122) becomes equal to or higher than a predetermined current value. With this arrangement, it is possible to determine the fastening state between the molded article (200) and the workpiece (202) in a simple configuration.

The molding system (10) may further be provided with an image capturing device (130) configured to capture images of the molded article (200) and the workpiece (202), and the assembled state judging unit (112) may be configured to judge that the assembled state has become the predetermined state when a target image is captured by the image capturing device (130). With this arrangement, it is possible to determine the assembling state properly. As a result, it is possible to sufficiently fasten the molded article (200) with the workpiece (202).

The molding system (10) may further be provided with a displacement sensor (140) configured to measure a displacement amount of the workpiece (202), and the assembled state judging unit (112) may be configured to judge that the assembled state has become the predetermined state when the displacement amount measured by the displacement sensor (140) becomes a predetermined displace amount or larger. With this configuration, it is possible to determine the fastening state between the molded article (200) and the workpiece (202) in a simple configuration.

The molding system (10) may further be provided with a touch switch (150) disposed on the hand (42) at a portion facing the molded article (200) through the workpiece (202) when the assembled part (204) is obtained. The assembled state judging unit (112) may be configured to judge that the assembled state has become the predetermined state when the touch switch (150) detects a contact by the molded article (200). With this configuration, it is possible to reliably determine the completion of the assembling. As a result, it is possible to sufficiently fasten the molded article (200) with the workpiece (202).

The present invention is not limited to the aforementioned embodiment. The present invention can be varied freely without departing from the gist of the present invention. Alternatively, it may be possible to arbitrarily combine the respective configurations without resulting in any inconsistency technically.

What is claimed is:

1. A molding system for assembling a part by displacing a workpiece, which is gripped by a hand of a robot, toward a mold of an injection molding machine, while rotating the workpiece and a molded article, which is supported on the mold, relative to each other, whereby the molded article and the workpiece are screw-engaged with each other, the molding system comprising:
   a rotation detector configured to detect a relative rotational amount between the molded article and the workpiece;
   an assembled state judging unit configured to judge whether an assembled state of the assembled part corresponds to a predetermined state or not; and
   a control unit configured to relatively rotate and displace the molded article and the workpiece until the rotational amount detected by the rotation detector exceeds a predetermined rotational amount and until the assembled state determined by the assembled state judging unit becomes the predetermined state.

2. The molding system according to claim 1, further comprising:
   a current measuring device configured to measure a load current value of a motor which relatively rotates the molded article and the workpiece;
   wherein the assembled state judging unit is configured to judge that the assembled state has become the predetermined state when the load current value measured by the current measuring device becomes equal to or higher than a predetermined current value.

3. The molding system according to claim 1, further comprising:
   an image capturing device configured to capture images of the molded article and the workpiece;
   wherein the assembled state judging unit is configured to judge that the assembled state has become the predetermined state when a target image is captured by the image capturing device.

4. The molding system according to claim 1, further comprising:
   a displacement sensor configured to measure a displacement amount of the workpiece;
   wherein the assembled state judging unit is configured to judge that the assembled state has become the predetermined state when the displacement amount measured by the displacement sensor becomes a predetermined displacement amount or larger.

5. The molding system according to claim 1, further comprising:
   a touch switch disposed on the hand at a portion facing the molded article through the workpiece when the assembled part is obtained;
   wherein the assembled state judging unit is configured to judge that the assembled state has become the predetermined state when the touch switch detects a contact by the molded article.

* * * * *